United States Patent [19]
El-Chahawi et al.

[11] 3,928,429
[45] Dec. 23, 1975

[54] METHOD OF PREPARING ARYL ACETIC ACIDS

[75] Inventors: Moustafa El-Chahawi, Troisdorf; Hermann Richtzenhain, Much-Schwellenbach, both of Germany

[73] Assignee: Dynamit Nobel AG, Troisdorf, Germany

[22] Filed: Nov. 16, 1973

[21] Appl. No.: 416,566

[30] Foreign Application Priority Data
Dec. 2, 1972 Germany............................ 2259072

[52] U.S. Cl.......... 260/515 R; 260/515 A; 260/520; 260/521 R; 260/521 A; 260/476 R
[51] Int. Cl.². ........................................ C07C 51/12
[58] Field of Search ..................... 260/575 R, 476 R

[56] References Cited
UNITED STATES PATENTS
3,708,529  1/1973  Cassar et al. ....................... 260/515

3,733,354  5/1973  Cassar et al. ....................... 260/515

OTHER PUBLICATIONS
Heck Jour. Amer. Chem. Soc. Vol. 85 (1963) pp. 2779–2782.

*Primary Examiner*—James A. Patten
*Attorney, Agent, or Firm*—Burgess, Dinklage & Sprung

[57] ABSTRACT

A process for preparing an aryl acetic acid which comprises contacting a compound of the formula

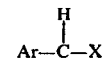

wherein Ar is an aromatic residue, X is a halogen with carbon monoxide and an alkali or alkaline earth metal oxide hydroxide or carbonate in the presence of a metal carbonyl catalyst and in the additional presence of a mixture of water and an alcohol.

12 Claims, No Drawings

METHOD OF PREPARING ARYL ACETIC ACIDS

BACKGROUND OF THE INVENTION

1. Field of the Invention

The present invention is directed to an improved method for preparing aryl acetic acids by the reaction of aryl methyl halide compounds with carbon monoxide in the presence of a mixture of water and an alcohol and in the further presence of a metal carbonyl and a basic substance.

2. Discussion of the Prior Art

It is in the prior art to prepare phenyl acetic acid by reacting benzyl chloride with alkali cyanide and then saponifying the nitrile to the acid (Ullmann (1953) Vol. 4, p. 291). Unsatisfactory in this process is the fact that it is performed in two steps. Furthermore, phenyl acetic acid may be obtained by the carbonylization of benzyl halides with the sodium salt of cobalt tetracarbonyl (R.F. Heck et al., J. Am. Chem. Soc. 85 (1963) 2779–82 and French Pat. No. 1,313,360). The use of sodium cobalt tetracarbonyl is technically difficult and produces poor yields. Also, phenyl acetic acid has been prepared by the carbonylization of benzyl chloride with catalysts on the basis of rhodium under high CO pressure (I. Tsuji, Nippon Kagaku Zashi 88 (1967) 687) and with catalysts on the basis of nickel carbonyl and iodine in polar solvents (German Offenlegungsschrift 1,914,391).

All these processes, however, have disadvantages, consisting mainly in the use of high pressures, the need for a great amount of catalyst, poor yields, low reaction speeds, or the use of solvents that are difficult to recover.

In another process (German Offenlegungsschrift 2,035,902) phenyl acetic acid is prepared by the carbonylization of benzyl chloride in the presence of a catalyst system composed of a cobalt salt, an iron-manganese alloy and a sulfur-containing accelerator in a mixture of water and methanol with the use of calcium oxide. Disadvantages of this process lie in the heterogeneity of the catalyst system, which necessitates a careful coordination of the components of the catalyst, and in the necessity of preparing the catalyst in situ prior to the reaction.

SUMMARY OF THE INVENTION

It has now been found that aryl acetic acids can be prepared in a simplified manner which does not entail the use of high pressures by the carbonylization of aryl hydrogen alkyls under atmospheric pressure or at slightly elevated pressures by carrying out the reaction in the presence of catalytic amounts of metal carbonyl in a mixture of water and an alcohol and in the further presence of a basic substance. The present invention, therefore, represents a process for preparing an aryl acetic acid which comprises contacting a compound of the formula $$Ar-\underset{\underset{X}{|}}{\overset{\overset{H_2}{|}}{C}}$$

wherein Ar is an aromatic residue, X is a halogen, with carbon monoxide and an alkali or alkaline earth metal oxide, hydroxide or carbonate in the presence of a metal carbonyl catalyst and in the presence of a mixture of water and an alcohol.

At the heart of the present invention is the use of a mixture of water and alcohol as a reaction medium in which the carbonylization of the aromatic methyl halogen takes place. Preferably, the alcohol employed has between 1 and 3 carbon atoms and therefore is suitably methanol, ethanol, normal propanol and isopropanol. The reaction takes place in the presence of a basic substance suitably an alkali or alkaline earth metal oxide, hydroxide or carbonate employing a metal carbonyl compound especially a metal carbonyl non-salt. Although not wishing to be bound by theory, it is believed that the aryl halogen methyl compound undergoes a reaction with the carbon monoxide and basic substance whereby the salt of the aryl acetic acid is formed from which the aryl acetic acid is isolated after acidification in a known manner.

The present invention is advantageously performed by introducing the aryl halogen methyl compound and carbon monoxide simultaneously into the mixture of water and alcohol. The carbon monoxide must be present in at least a stoichiometric amount relevant to the amount of halogen atoms on the methyl group. However, it is highly desirable to employ an amount of carbon monoxide which is greatly in excess of the stoichiometric amount, bearing in mind the nature of this gaseous substance and the additional fact that the process can be carried out at atmospheric pressure or by the use of mildly elevated pressures. The reaction medium employed is a mixture of water and an alcohol. The water is present in an amount between 5 and 60 weight percent, preferably between 20 and 40 weight percent, based upon the combined weight of the water and the alcohol.

The ratio of the basic substance, e.g., alkali or alkalin earth metal oxide, hydroxide or carbonate to the aryl halogen methyl compound (AHM) should be at least two moles of mono-acid base or one mole of a di-acid base per halogen atom of the aryl halogen methyl compound. The following equation represents a theoretical equation which may explain the reaction mechanism involved in the carbonylization of a typical aryl halogen methyl compound:

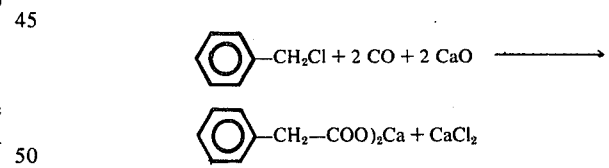

Thus depending upon how many halogen atoms are to be substituted by a carbonyl group the amount of basic substance will vary. The basic substance is, however, preferably employed in a slight or mild excess but up to no more than 1.8 times the stoichiometric amount. Preferably 2.4 to 3 moles of a monoacid base or 1.2 to 1.5 moles of a di-acid base are employed per halogen atom per mole of the aryl halogen methyl compound.

A wide variety of basic substances can be employed. These include in particular the alkali hydroxides or carbonates which can be employed in dissolved or solid form. Alkaline earth oxides, hydroxides, or carbonates can be used but these generally are used in a solid or in suspension form on account of their poor solubility.

The basic substance can be proportioned into the reactor in the form of a solution, suspension or solid in an amount approximately equivalent to the amount of aryl halogen methyl compound employed. Additionally, the basic substance can be placed in the reactor before the aryl halogen methyl compound is introduced, i.e., it can be introduced into the reactor when the same contains only the aqueous alcohol mixture.

The aqueous alcohol mixture containing the metal carbonyl catalyst and the basic substance is initially heated to a temperature of 30° – 70° C, preferably to 40° – 60° C and the aryl halogen methyl compound and carbon monoxide are fed therein, preferably simultaneously, over a period of 2 to 6 hours with good mixing of the gas phase to ensure maximum contact of the carbon monoxide with the components of the liquid reaction mixture. Process can also be carried out by utilizing temperatures up to 100° C or more. Under such circumstances, it may be desirable to impose a slight pressure to ensure that the carbon monoxide remains in contact with the components of the liquid reaction mixture. For the performance of the reaction, carbon monoxide can be used in a wide-range of pressures.

The reaction takes place even at a carbon monoxide pressure of less than one atmosphere, i.e., at subatmospheric pressures. However, it is desirable to contact the reaction mixture with the carbon monoxide at a pressure of about atmospheric pressure or at a slightly elevated pressure. Pressures up to and above 25 atmospheres gauge are contemplated, although pressures above 25 atmospheres gauge are not necessary. Typical elevated pressures are those pressures falling within the range 1 atm. to 10 atm. Pressures in excess of the last value are not necessary in accordance with the process of the present invention.

In the process described herein metal carbonyl catalysts are used. These catalysts include particularly carbonyls of cobalt or iron such as Fe $(CO)_5$ and $(Co)_2(CO)_8$. These catalysts can be used as such or they can be added in the form of a solution.

Suitable organic solvents for the metal carbonyls include straight chained and cyclic aliphatic ethers such as diethyl ether, dipropyl ether, tetrahydrofuran, dioxane, alcohols having between 1–3 carbon atoms, esters such as alkyl esters of acetic acids with lower alcohols, especially alcohols with 1–5 carbon atoms.

The catalyst can be employed in the form of a solution formed by the carbonylization of a cobalt salt, in one of the above-named solvents, for example, under the usual conditions of carbonylization, and is used in that solution for the reaction.

The weight ratio of metal carbonyl to aryl halogen methyl compound can range between 1:1 and 1:500 preferably between 1:10 and 1:250.

In accordance with the present invention, a wide variety of aryl halogen methyl compounds can be reacted. For instance, one can react monochloride. In all instances, the aryl group can be both substituted and unsubstituted. The aryl group can be a condensed or uncondensed aromatic ring and can contain one or more additional substituents such as a halogen, an alkyl radical of one to six carbon atoms or an alkoxy radical of one to six carbon atoms. The aryl group can be a fused ring such as a naphthyl group or it can be a compound derived from removing a ring hydrogen from biphenyl. Examples of reactants contemplated are mono-, di- and tetra- halo phenyl chloromethane; dimethyl, diethyl or dipropyl phenyl-chloromethane, dimethoxy, mono- or diethoxy phenyl chloromethane.

Similarly, the reaction of naphthyl chloromethane is also contemplated.

Accordingly, the term "aryl acetic acid" is meant to include both the unsubstituted phenyl acetic acid as well as substituted phenyl acetic acid, condensed or uncondensed aromatic rings being able to be present as aryl radicals which can contain one or more additional substituents such as the aforenoted halogen substituents especially chlorine, bromine, fluorine and iodine, aryl radical such as phenyl, alkyl radicals with one to six carbon atoms, alkoxy radicals with one to six carbon atoms and the like. Examples of products prepared in accordance with the present invention are mono-, tetra-chlorophenyl acetic acid, di-chlorophenyl acetic acid, tetra-chlorophenyl acetic acid, mono-methylphenyl acetic acid, di-methylphenyl acetic acid, di-ethylphenyl acetic acid, propylphenyl acetic acid, mono-methoxyphenyl acetic acid, di-methoxyphenyl acetic acid, ethoxyphenyl acetic acid, di-ethoxyphenyl acetic acid, naphthyl acetic, anthracyl acetic acid and biphenylacetic acid.

Starting substances are usually unsubstituted or substituted aryl halogen methyl compounds of which benzyl halide is a typical example. It is preferred that the halogen substituent of the methyl group of the aryl halogen methyl compound be chlorine.

The proportioning of the carbon monoxide and, if desired, of the basic substance, is generally performed over a period of between two and six hours. The reaction is generally complete at the end of three to four hours. It should be understood that while carbon monoxide is employed as a reactant the carbon monoxide can be introduced as pure carbon monoxide or in the form of a gas mixture of carbon monoxide and an inert gas.

Water gas or other mixed gases containing carbon monoxide are contemplated.

During the reaction there is often formed minor amounts of the corresponding ester of the aryl acetic acid being prepared. The ester can be conveniently transformed to the desired aryl acetic acid through alkaline saponification by heating a mixture of the ester and a suitable alkaline saponification medium for a short period of time. Usually during reaction pH is held between 7.1, preferably 7.5 to 14.

The phenyl acetic acids prepared by the process of the present invention are valuable chemical intermediates. Specific end uses for the phenyl acetic acid include: The phenyl acetic acids can be used as additives which are useful as speed regulators or raw materials in a process producing penicillins. Further, converted to phenyl acetic acid esters, they are used as perfumes or odoriferous substances.

In order to more fully illustrate the nature of the invention and the manner of practicing the same, the following examples are presented:

EXAMPLE 1

6 grams of cobalt octacarbonyl are added to 100 ml of methanol. Then CO at a pressure of 600 mm Hg is passed through with stirring (500 rpm) at 35°C for 30 minutes. Then 310 ml of methanol and 250 ml of water are added and the mixture is heated to 55°C. Then 99 g of CaO is added and, with the constant passage of CO through the mixture, 190 g (1.5 mole) of benzyl chloride is proportioned into it at a stirring speed of 500 to 750 rpm. Carbon monoxide is introduced after about 2½ hours until no further absorption takes place. Then the reaction mixture is cooled to 20°C, water is added, the mixture is acidified with hydrochloric acid and then it is extracted with ether. After removal of the ether by distillation a reaction mixture is obtained from which 166 g of phenyl acetic acid (yield 81%) and 14 g of phenyl acetic acid methyl ester (yield 6%) are isolated by distillation.

EXAMPLE 2

Under the conditions described in Example 1, but with the use of 4 g of cobalt octacarbonyl, dissolved in 65 ml of ethanol, and with the addition of 210 ml of ethanol and 170 ml of water and 66 g of CaO, 127 g of benzyl chloride is reacted with CO. The reaction and the processing of the product are performed as in Example 1. 109.5 grams are distilled, which according to gas chromatographic analysis consist of:

| | |
|---|---|
| Benzyl chloride | 5.26% |
| Phenyl acetic acid ethyl ester | 29.32% |
| Phenyl acetic acid | 61.32% |

If i-propanol is used as the solvent, phenyl acetic acid plus phenyl acetic acid i-propyl ester are found.

Upon the analogous use of MgO instead of CaO, similar results are obtained.

EXAMPLE 3

In accordance with the procedure of Example 1, 60 ml of a 10 wt-% solution of cobalt octacarbonyl in acetic acid ethyl ester, 310 ml of methanol and 250 ml of water, 80 g of CaO and 161 g of p-chlorobenzyl chloride are reacted with CO. The reaction is performed and the products are processed as in Example 1. 29 g of p-chlorbenzyl chloride, 19 g of p-chlorophenylacetic acid methyl ester and 111 g of p-chlorphenylacetic acid are isolated.

Under similar reaction conditions, p-methylphenylacetic acid is prepared from p-methylbenzyl chloride with much the same yield.

EXAMPLE 4

Under the conditions described in Example 1, but with the use of 20 ml of iron pentacarbonyl dissolved in 65 ml of methanol, 210 ml of methanol and 170 ml of water plus 66 g CaO, 127 g of benzyl chloride is reacted with CO. The reaction is performed and the products are processed as in Example 1. 62.5 g is distilled, containing

| | |
|---|---|
| Benzyl chloride | 74.21% |
| phenyl acetic acid methyl ester | 4.61% |
| phenyl acetic acid | 16.40% |

EXAMPLE 5

As described in Example 1, using 4 g of cobalt octacarbonyl dissolved in 80 ml of methanol, 210 ml of methanol and 170 ml of water and 66 g of CaO, 127 g of benzyl chloride is reacted with a gaseous mixture of CO/$H_2$ in a ratio of 3:2. The reaction is conducted and the products are processed as in Example 1. 103 g are distilled, which consist according to gas chromatographic analysis of:

| | |
|---|---|
| Benzyl chloride | 63.52% |
| Phenyl acetic acid methyl ester | 4.92% |
| Phenyl acetic acid | 25.91% |

A further improvement of the yield or an increase in the speed of the reaction is attained by repeated purging of the gas chamber and removing the gas mixture containing a great concentration of $H_2$, and introducing fresh water gas.

EXAMPLE 6

6 g of Co(CO)$_8$ are added to 100 ml of methanol. Then carbon monoxide is passed through at a pressure of 600 mm Hg with stirring (500 rpm) at 35°C for 30 minutes. Then 310 ml of methanol is added and the mixture is heated to 55°C. With a strong pass-through of CO, in the course of 3 hours 190 g (1.5 moles) of benzyl chloride and 120 g of NaOH dissolved in 250 ml of water are added at a stirring speed of 500 to 750 rpm. Carbon monoxide was introduced after about 2½ hours until no further absorption occurred. Then the reaction mixture is cooled to 20°C, water is added, and the mixture is acidified with hydrochloric acid and then extracted with ether. After removing the ether by distillation one obtains a reaction mixture from which 132 g of phenyl acetic acid and 70 g of phenyl acetic acid methyl ester are isolated by distillation.

As seen from the above description and the examples of the invention the reaction mixture is acidified with a suitable acid followed by an extraction procedure. The acidification converts the salt of the basic substance to the desired aryl acetic acid. The acidification can be carried out by contacting the reaction mixture with a strong acid. Generally speaking, acids which can be used for this purpose include in particular the strong mineral acids such as hydrochloric acid, sulphuric acid, phosphoric acid, which are contemplated include the strong organic acids such as toluene sulphonic acid. Naturally, the precise acid employed in the subsequent acidification is not particularly critical.

EXAMPLE 7

In analogous manner as described in example 1 instead of CaO 160 g of Na$_2$CO$_3$ were used to held the solution on alkaline pH. Performance of the reaction, the isolation of the product and yield were unchanged.

EXAMPLE 8

15 g of cobalt hydroxicarbonate were solved in an autoclave in 80 g of methanol and 20 g of diethyl ester and saturated with a H$_2$/CO - water-gas-mixture at 140°C. After half an hour temperature was lowered to 60°C and 190 g of benzyl chloride and a solution of 110 g NaOH in 220 ml of water was added. By further procedure as described in example 6 corresponding results were obtained.

What is claimed is:

1. A process for preparing an aryl acetic acid which comprises initially heating to 30°–70°C and thereafter contacting a compound of the formula

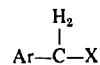

wherein Ar is an aromatic residue and X is a halogen with at least a stoichiometric amount relative to the halogen of carbon monoxide and a stoichiometric excess up to 1.8 times the stoichiometric amount of an alkali or an alkaline earth metal oxide, hydroxide or carbonate in the presence of a cobalt or iron carbonyl catalyst and in the additional presence of a mixture of water and an alcohol and thereafter subjecting the reaction mixture to a treatment with a strong acid.

2. A process according to claim 1, wherein the cobalt carbonyl catalyst is cobalt octacarbonyl.

3. A process according to claim 1, wherein the iron carbonyl catalyst is iron pentacarbonyl.

4. A process according to claim 1, wherein the catalyst is formed by carbonylization in organic solvent and used in that solution.

5. A process according to claim 1, wherein X is chlorine.

6. A process according to claim 1, wherein the weight ratio of metal carbonyl to the compound whose formula is set forth therein is between 1:1 and 1:500.

7. A process according to claim 6, wherein the weight ratio of metal carbonyl to aryl halogen methyl compound is between 1:10 and 1:250.

8. A process according to claim 1, wherein an alkaline earth oxide, alkaline earth carbonate, alkali hydroxide or alkali carbonate is employed.

9. A process according to claim 1, wherein the reaction is performed at a temperature in the range from 10° to 70° C.

10. A process according to claim 1, wherein the reaction is performed at a carbon monoxide pressure of 0.5 to 25 atmospheres absolute.

11. A process according to claim 1, wherein the reaction is performed with a gas mixture containing carbon monoxide.

12. A process according to claim 1, wherein pH is held between 7.1 and 14.

* * * * *

UNITED STATES PATENT AND TRADEMARK OFFICE
CERTIFICATE OF CORRECTION

PATENT NO. : 3,928,429
DATED : December 23, 1975
INVENTOR(S) : Moustafa El-Chahawi et al It is certified that error appears in the above—identified patent and that said Letters Patent are hereby corrected as shown below:

In the Abstract $$\overset{H}{\underset{|}{Ar-C-X}} \quad \text{should be} \quad \overset{H_2}{\underset{|}{Ar-C-X}}$$

Column 2 line 46

"2" is omitted before  in the first line of the equation.

Signed and Sealed this

Twenty-eighth Day of September 1976

[SEAL]

Attest:

RUTH C. MASON
*Attesting Officer*

C. MARSHALL DANN
*Commissioner of Patents and Trademarks*